United States Patent Office 3,397,185
Patented Aug. 13, 1968

3,397,185
ANIONIC POLYMERIZATION OF LACTAMS WITH A CARBONATE DIESTER CONTAINING N-HETEROCYCLIC SUBSTITUENT AS PROMOTER
Marvin T. Tetenbaum, Petersburg, Va., assignor to Allied Chemical Corporation, New York, N.Y., a corporation of New York
No Drawing. Filed Feb. 24, 1964, Ser. No. 347,056
18 Claims. (Cl. 260—78)

This invention relates to improvements in the polymerization of lactams to polyamides, and more particularly to an improved process for rapid polymerization of lactams employing novel combinations of catalyst and activator ingredients.

It is well known that lactams containing at least 3 carbon atoms in the lactam ring can be polymerized to form high molecular weight polymers useful in the production of fibers, films, cast objects, and other shaped structures. Various catalytic entities have been employed in different polymerization processes. The most prevalent method of polymerization, especially for ε-caprolactam, has been the hydrolytic method wherein the caprolactam is heated in the presence of water at elevated temperatures and pressures for periods of time of 4 to 15 hours. In addition to the disadvantage of the long time cycle required in the hydrolytic polymerization process, the polymerized product is found to contain an equilibrium concentration of approximately 10% of monomer which must be removed by purification operations before the polymer can be satisfactorily utilized. Such purification operations are expensive, and frequently contribute to discoloration of the polymer. Other catalytic agents and methods have also been employed but entail disadvantages such as long time cycles required for polymerization, necessity of elevated temperatures or pressures, formation of undesired impurities or residual unpolymerized monomer, or discoloration effects due either to the catalyst system employed or the sensitivity of the system to oxidative degradation during polymerization. Although rapid, low temperature polymerization methods are known for the production of polyamides from lactams employing anionic catalysts with various activators or promoters, such methods have generally been found to be erratic and adversely affected by the presence of oxygen and various commonly encountered polymer additives.

It is an object of this invention to provide an improved promoter for the anionic polymerization of lactams. It is another object of this invention to provide a highly effective promoted lactam composition useful for rapid anionic polymerization below the polymer melting point to polymers having low content of unpolymerized lactams. Among specific advantages of this invention are that it provides a process for the rapid polymerization of lactams, especially ε-caprolactam, which can be carried out in the presence of various extraneous materials and additives. In particular, advantages are that my promoter operates in presence of oxygen, e.g. oxygen of air, to produce essentially non-discolored polymer; it operates in the presence of solid additives such as pigments, fillers, reinforcing agents and the like to produce high molecular weight polyamides containing little residual monomer; and it operates in presence of liquid diluents such as solvents of the monomer and/or of the polymer to produce compositions suitable for extrusion, foaming, etc. Other objects and advantages will become apparent in the following disclosure.

The objects of this invention are accomplished in general by providing as promoter, in anionic lactam polymerization process, at least one carbonate diester wherein at least one of the ester radicals is of the group consisting of (a) radicals in which a carbon atom of the radical is linked to an oxy oxygen atom of the carbonate radical, which carbon atom in turn is bonded by a double bond to a nitrogen atom in the ester radical; and (b) radicals in which a carbon atom of the radical is linked to an oxy oxygen atom of the carbonate radical, said carbon atom being in one of the positions 2- and 4- in a 6-membered aromatic heterocyclic ring wherein nitrogen is in the 1-position.

In the promoters which I have found to be particularly effective, the carbon atom linking the above specified ester radical to the oxy oxygen atom of the carbonate radical is a member of a heterocyclic ring.

A general formula for the promoters of my invention can be written as follows:

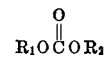

wherein the radical designated $R_1$ is the nitrogen-containing radical above defined and the radical designated $R_2$ is an organic radical which can be the same as the radical $R_1$.

Lactams which can be polymerized in accordance with this invention contain a saturated ring having at least three carbon atoms in addition to the amide group, and said carbon atoms may contain hydrogen atoms, hydrocarbon substituents, alkylene bridges between two lactam rings, or other substituents which do not decompose the catalyst-activator system or otherwise interfere with the desired polymerization process. Examples of lactams particularly suitable in the practice of the present invention include: ε-caprolactam, omega-caprylolactam, omega enantholactam, omega laurolactam (13-member ring), and mixtures thereof. These lactams can be homopolymerized and can be copolymerized with each other in accordance with my invention. Moreover these lactams, suitably in major molecular proportions in the reaction mixture, can be copolymerized with di-lactams such as those of British Patents 742,479 published Dec. 30, 1955; 824,207 published Nov. 25, 1959; and 880,761 published Oct. 25, 1961; e.g. methylene-bis-ε-caprolactam and isopropylidene-bis-ε-caprolactam. With respect both to polymerization characteristics and properties of the polymers, lactams in which the ring contains at least 7 atoms form a separate and distinct group from those with ring of 6 or fewer atoms, as is well known. For purposes of this invention, the lactams having a ring of at least 7 members, consisting of methylene groups and one carbonamide group, are preferred as at least the major proportion by weight of lactam polymerized; but the invention is also applicable, at temperatures preferably about 25° C.–100° C., to lactams with 4-, 5- and 6-membered rings for example azetidine-2-ones such as 4,4-dimethyl azetidine-2-one, 2-pyrrolidone, and 2-piperidone.

Anionic catalysts useful in the practice of this invention are metal-containing chemical species which, in reactive contact with water, impart a basic pH to the water. Specific classes of such catalysts include: the alkali and alkaline earth metals (e.g., sodium, potassium, lithium, calcium, strontium, barium, magnesium, etc.) and their hydrides, oxides, hydroxides, carbonates, amides, borohydrides, azides, etc. Also effective as catalysts are organic derivatives of metals wherein the organic moiety has extremely weak acidic tendency (e.g., a pKa greater than 6.0, thereby having considerably weaker acidic strength than carboxylic acids). Examples of such organometallic catalyst compounds include: metal alkyls and aryls such as butyllithium, vinyllithium, ethylpotassium, propylsodium, phenylsodium, diphenylmagnesium, diethylzinc, triisopropylaluminum, diisobutylaluminum hydride, etc.; Grignard reagents such as methylmagnesium bromide, phenylmagnesium bromide, and the like; metalated amines, amides, and lactams; metal ketyls and acetylides; and other metallo-organic species. Preferred catalyst species can frequently be prepared in situ in the lactam to be polymerized, e.g., the alkali metal salts of the lactam can be prepared in situ from a metal hydroxide, carbonate, or hydride and the lactam to be polymerized. The anionic catalysts generally preferred are capable of initiating polymerization of lactams in absence of promoters, although at relatively slow rates at least unless temperatures above the normal melting point of the resultant polymer are used.

The carbonate di-ester ingredient which serves as the activator or promoter in the process of this invention, consists essentially of the carbonate radical

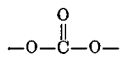

esterified with two organic radicals, hereinafter referred to as "ester radicals." At least one of said ester radicals, viz. $R_1$ of the above formula, contains a nitrogen atom doubly bonded to carbon. Although both ester radicals may contain nitrogen and may in fact be the same, for convenience of reference one ester radical will hereinafter be referred to as the nitrogen-containing ester radical. Both ester radicals are joined to the carbonate radical by means of a single covalent bond between an oxy oxygen atom of the carbonate radical and a carbon atom of the ester radical.

The nitrogen-containing ester radical can be regarded as derived from precursor compounds which exhibit a prototropy form of tautomerism, generally of the lactam-lactim type, as described in Advanced Organic Chemistry by G. W. Wheland, John Wiley & Sons (1949), pages 617–623. Precursor compounds in which the prototropy involves ring nitrogen, either aromatic or nonaromatic, are generally preferred in view of their greater tendency toward the formation of lactim structures, in which form the precursor compounds are reactive with, e.g., chloroformates to produce active di-ester promoters of this invention. Suitable nitrogen-containing ester radicals include radicals derived by removal of a hydrogen atom in the 2- or 4-position relative to a ring nitrogen, from aromatic 6 membered ring species such as pyridines, pyridazines, pyrimidines, pyrazines, triazines, and condensed ring analogs thereof such as quinolines, quinazolines, naphthyridines, and the like; and by removal of hydrogen from the 2-position relative to ring nitrogen in other ring systems such as oxazines, oxazoles, thiazoles, benzoxazoles, benzothiazoles and more highly saturated ring compounds, viz. cyclic anils such as 2-oxo-hexamethylene-imine ($\epsilon$-caprolactam).

Nitrogen-containing prototropic compounds in which the doubly bound carbon and nitrogen atoms are not members of a ring can also provide suitable precursor compounds for purposes of my invention, especially when an aromatic ring such as phenyl is linked to said carbon or nitrogen atom whereby said double bond is stabilized, as in benzamide and benzanilide. In all cases, the nitrogen-containing ester radical is bonded to the carbonate function via a carbon atom of said ester radical.

An especially preferred class of heterocyclic radical structures consists of the cyclic anils in which the ring structure of the nitrogen-containing ester radical is the ring of the lactim form of a lactam polymerizable by the process of this invention. For example, in the case of $\epsilon$-caprolactam, such nitrogen-containing ester radical would have the cyclic anil structure:

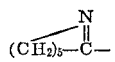

Examples of suitable ester radicals designated as $R_2$ in the above formula for the promoters of this invention include alkyl radicals such as methyl, ethyl, propyl, butyl, isopropyl, hexyl, isohexyl, heptyl, octyl, nonyl, octadecyl; cyclic radicals such as cyclopropyl, cyclopentyl, cyclohexyl, pyrrolidyl, oxazolyl; aryl radicals, including heterocyclics, such as phenyl, naphthyl, pyridyl, quinolyl, thiazolyl; aralkyl radicals such as benzyl, phenylethyl; and homologs and analogs of the above radicals, which may contain various non-interfering substituents but should preferably be free of active hydrogen atoms as may be determined by the Zerewitinoff method as described by Kohler et al. in J. Am. Chem. Soc., 49, 3181–8 (1927). As above mentioned, the radical $R_2$ can also be a nitrogen-containing ester radical as above defined.

The promoters of this invention may in general be prepared by methods such as the reaction of a lactim-O-alkyl ether with esters of chlorocarbonic acid, as described in German Patent 949,057, issued Sept. 13, 1956; the reactions of phosgene or t-butyl carbazate with suitable phenolic or enolic heterocyclic entities and/or alcohols, and mixtures thereof; ester interchange reaction of diethylcarbonate with suitable tautomeric lactim or enol species; and other synthetic methods. Examples of compounds exhibiting prototropy which may, through appropriate methods of synthesis provide suitable nitrogen-containing ester radicals in the activators of this invention include: 2-hydroxy pyridine, a hydroxy s-triazine, 2-hydroxyquinoline, 2-hydroxy benzoxazole, 2-pyrrolidone, $\epsilon$-caprolactam, omega-enantholactam, N-ethyl benzamide, benzanilide, and analogous species. The ethers of the lactim or enol forms of the above mentioned species can frequently be employed in the preparation of activators when the hydroxyl species is unavailable or proves unsuitable. For example, caprolactim-O-methyl ether, 2-ethoxy pyridine, etc. can be employed in producing carbonates for use in my invention.

In the process of this invention, the lactam composition to be polymerized is mixed at a temperature above its melting point, and under anhydrous conditions, with catalyst and my promoter added stepwise or simultaneously. The catalyst is generally employed in concentrations ranging from about 0.01 to 10% by weight of the lactam, with a preferable range being between 0.05 and 2%. The specific amount of catalyst to be used depends upon its activity, equivalent weight, and the desired molecular weight of the polymer, since the polymer molecular weight is found to decrease as the amount of catalyst used increases. The promoter is employed in concentrations ranging from about 0.0001% to 5.0% by weight of the lactam, with a preferable range being between 0.01% and 0.5%. The ratio of gram atom equivalents of catalyst metal:gram moles of promoter in the process of this invention is generally between about 0.1:1 and about 20:1, more particularly between about 0.2 and 3:1 and preferably between 0.7 and 1.3:1. Various additives can be incorporated into the molten monomer composition prior to polymerization, as will be apparent from the discussion below.

To effect polymerization, the lactam composition containing an anionic catalyst and promoter of this invention is heated to a temperature above the melting point of the monomer which may nevertheless be below the melting point of the polymer. For polymerizing the preferred lactams having 7 membered or larger rings, the temperature will usually be within the range from about 100° C. up to the polymer decomposition temperature which can be above 300° C. A preferred minimum temperature to assure prompt reaction of these polymers is about 120° C. The temperature can be brought to the desired range by various means such as conduction of heat into the composition through the confining walls of a vessel; by dielectric or radiant heating means; by direct contact with heated vapors; or by mixing a heated lactam composition containing one ingredient, say the activator, with a lactam composition at lower temperature containing the other member of the activator-catalyst system. Since the polymerization reaction is exothermic, initiation of polymerization at one point of the system may in certain applications generate sufficient heat to elevate the remaining monomer to adequate polymerization temperature. Atmospheric, reduced, or elevated pressures can be employed during the polymerization.

To protect the active anionic catalyst against conversion to inactive compounds prior to and during polymerization, it is necessary to protect the system from moisture. This is most suitably done by blanketing the lactam composition and all ingredients added thereto, during storage and transit, with anhydrous air or nitrogen. At temperatures below polymerization temperatures, and especially at room temperature or under refrigeration, lactams containing a catalyst and activator of this invention are fairly stable for reasonable periods of time during storage and transit, said compositions retaining their ability to undergo polymerization. The storage stability of the lactam compositions of this invention can be further improved by providing lactam, e.g. as particles, containing only one member of the catalyst-activator system, and another group of particles containing the other member of the catalyst-activator system with or without lactam. Another means of securing improved storage stability is by the microencapsulation of the activator or catalyst ingredient by inert encapsuling ingredients which melt or dissolve at a desired elevated temperature.

When the process of this invention is used to produce shaped articles directly in a mold or by injection or extrusion, etc., it is usually desirable to allow time for any bubbles to escape from the liquid reaction mixture before polymerization begins. Accordingly, in such operations the mixing will usually be accomplished below the polymerization temperature and, after escape of any bubbles, the mixture will be heated at least enough to start the polymerization as indicated e.g. by start of gelation of the reaction mixture. Removal of bubbles can be accelerated by agitating the container or mold, or by applying a vacuum to the system.

Rotational and other casting and molding techniques can be employed to convert the liquid monomer directly into a solid shaped article. Since there are no volatile byproducts to be released the mold can be entirely closed.

Auxiliary materials can be incorporated at any stage and advantageously are incorporated into the monomer by dispersion therein, prior to or in the early stages of polymerization. The low melt viscosity of the monomer facilitates uniform mixing. Auxiliary additives which can be employed include: carbon black, metal powders, reinforcing fibers such as glass, asbestos, etc.; pigments, fillers, and reinforcing powders such as colloidal silica, silicates, sand, etc. when free of water; powders, fibers, and fabrics from other polymers; chemical and solvent blowing agents; mold release agents such as sodium stearate; cross-linking agents such as organic peroxides, blocked diisocyanates, and the diurethanes of U.S.P. 2,675,369 of Apr. 13, 1954, to Scrutchfield; anti-static agents; microballoons; flame retardants; agents to nucleate crystallization; stabilizers toward ultraviolet and/or thermal and/or oxidative degradation; fluoroescent materials; bactericidal agents; and various other materials. Additive materials having active hydrogen are to be avoided during the early stages of polymerization since these tend to diminish or destroy the polymerizability of the system. These materials may however be added with less adverse effect at later stages of polymerization.

In certain instances it is possible to prepare block copolymers with addition-type polymers by effecting lactam polymerization in accordance with this invention in the presence of a "living" or still active anionically catalyzed polymer prepared from styrene, butadiene, acrylate esters, and other ethylenic monomers. Active chemical species such as ethylenic monomers, ethylene oxide, formaldehyde, and isocyanates may effect useful polymer modifications upon addition to the polymerization system during the later or terminal stages of the reaction. Useful compositions of varied properties are obtained by the elevated temperature blending of polymers prepared in accordance with this invention, with other polymers such as polyvinyl chloride, polychloroprene, chlorinated rubber, chlorinated polyolefins, silicones, polyacetals, polycarbonates, polyurethanes, polyesters, and cellulose esters.

In addition to methods of melt polymerization, the polymerization process of this invention can be carried out in inert diluent fluids free of active hydrogen. Such fluid can be a solvent of both monomers and polymer, such as dimethyl formamide, dimethyl acetamide, etc. The resultant polymer solutions or polymers swollen and/or plasticized with solvent are eminently suited for use in forming coatings, films, fibers, and fibrids; and in the production of foam structures employing the solvent as the blowing agent. Alternatively, the inert diluent fluid can be selected so as to dissolve monomer but not polymer, in which case precipitated polymer powder is obtained, said powder being useful in fluidized bed coating operations, dry blending techniques and sintering methods for the production of shaped articles. The inert diluent fluid can also be a thermoplastic material such as a hydrocarbon polymer above its melting point, which, upon lactam polymerization and solidification forms a blended polymer composition. In addition to dimethyl formamide, useful solvents are those known for nitrogen-containing polymers such as polyamides and polyacrylonitriles and free of active hydrogen as determined by the Zerewitinoff method above cited; for example tetrahydrofurane, dimethyl sulfoxide, tetramethylene sulfone, acetonitrile, glutaronitrile, nitromethane, N-formyl morpholine, N-formyl pyrrolidine, N-formyl-ε-caprolactam, succinic anhydride, trisdimethylaminophosphine oxide, gamma-valerolactone, and like compounds and their mixtures.

Polymerization may be effected in preselected regions by localization of either the catalyst or activator in preferred configurations. For example, a surface impregnated or printed with the activator of this invention may be immersed in an elevated temperature lactam composition containing catalyst to effect polymerization at those areas of the immersed surface containing activator, or likewise, preferential coatings may be effected by exposing a surface, printed with a composition of promoter and catalyst, to heated lactam vapors.

In a specific embodiment of this invention, cellulose pulp dispersed in dry xylene is treated with metallic sodium. Upon adding thereto a solution of ε-caprolactam in dimethylformamide plus promoter of this invention, localized polymerization occurs on the cellulose surface, causing encapsulation thereof. In another embodiment, catalyzed monomer is extruded into a bath containing promoter to effect continuous fiber or film formation; or said extrusion can be under high shear and will then produce fibrids or paper-making fibers.

The polymerization process of this invention is useful in the production of laminated structures. Polymerization can also be carried out in situ within porous open structures such as open-celled sponges of metal, ceramic, or high-melting organic material, and fibrous structures such as leather, papers, woven and non-woven fabrics, and batting. Ionizing radiation, ultrasonic techniques and microwave heating may also be employed in conjunction with the method of polymerization of this invention.

Polymerization may also be carried out by continuous bulk methods in conventional resin reactor equipment and the product may be directly converted without intervening solidification and remelting, into useful shaped articles by extrusion or molding methods; or the polymer so produced may be converted into solid comminuted form suitable for utilization in subsequent conventional fabricating operations. Comminuted polymer containing small amounts of occluded volatile material can be employed in the molding of foamed structures. In comminuted form, polymer produced in accordance with this invention can be subjected to washing with water, aqueous ammonium acetate, or other solvent systems. Various conventional polymer additives can be blended therewith by dry mixing or melt blending techniques prior to utilization.

Although we do not wish to be bound to any theoretical interpretations, it is felt that in the polymerization of lactams by the process of this invention, the catalyst probably interacts with lactam to form a lactam salt of the catalyst metal, and that the promoter causes heterolytic cleavage of the N–C bond of the amido group of the lactam. Chain growth may continue by the continued addition of lactam salt of the catalyst metal to the carbonyl end of the previously cleaved lactam unit. The metal atom probably exchanges between the growing polymer and lactam monomer to regenerate the catalytic lactam salt. Thus, the interaction of equal molecular proportions of catalyst, activator, and lactam yields a substance capable of polymer chain growth.

In the course of ordinary polymerization in bulk form, e.g. in test tubes, wherein the composition may be continuously observed it is found that a gel structure forms followed by solidification, followed in turn by slight contraction of the solid such that it detaches or breaks away from the confining surface. It has been found that the gel state represents a point of essentially complete polymerization but without crystallization of the polymer. As the polymer undergoes crystallization it solidifies; and with extensive crystallization it contracts slightly, thereby detaching itself from the shaping surfaces. The elapsed time from initiation of polymerization to gelling is thus indicative of the rate of polymerization, and the total elapsed time from initiation to solidification or breakaway is indicative of both the rates of polymerization and crystallization.

In practical applications such as injection molding, the mold can be filled with polymer in the gel or precursor stages of polymerization, and, by permitting sufficient elapsed time for crystallization, the article can be removed from the mold without cooling. This represents a decided advantage over injection molding operations with ordinary thermoplastics wherein the mold must repeatedly be cooled to cause the polymer to solidify for removal of the article from the mold. Employing the process of this invention however, the mold need not be cooled, since a temperature can be used which effects polymerization and also allows solidification to occur. It is preferable in such operations to utilize a suitable catalyst/activator system of this invention such that the breakaway time occurs within a reasonably short time after gelling.

The polymer can be extruded in the gel state to form filaments. In such operations, a catalyst-promoter system providing very rapid solidification is desirable to allow promptly winding up the filaments without their coalescing.

The best mode contemplated by me for carrying out the invention as set forth below and in the following examples which describe completely specific embodiments of my invention.

An alkali metal salt of ε-caprolactam was used in the examples as the anionic polymerization catalyst as an essentially pure product, or as a concentrate in caprolactam. The salt can be prepared as follows:

EXAMPLE A 300 milliliters of anhydrous liquid ammonia were condensed in a one liter three-necked flask fitted with a stirrer and a Dry Ice condenser. 3.9 grams (0.1 mol) of metallic potassium was added followed by 0.005 gram of ferric chloride. Upon stirring, a white suspension of potassium amide appeared. At this point, 11.3 grams (0.1 mol) of distilled caprolactam was added, and the mixture was stirred for 1 hour. The ammonia was then allowed to evaporate, and the residue was dried first for 1 hour at 40° C., then at 80° C. for 5 hours in a vacuum oven over a stream of nitrogen. The lactam salt was obtained in theoretical yield as a white, free-flowing powder, having a melting point 200°–215° C.

The activator is added to the lactam which is to undergo polymerization or to an inert diluent which will be incorporated in the polymerization system. The following Example B illustrates suitable process for the preparation of activators of this invention.

EXAMPLE B 21.7 grams of ethyl chloroformate were added dropwise, over a one hour period, to 25.4 grams of caprolactim-O-methyl ether, previously prepared by the reaction of ε-caprolactam with dimethyl sulfate by the method of Benson, et al., J. Am. Chem. Soc. 70, 2116 (1948). The reaction mixture was maintained at 75° C. with continuous agitation. Methyl chloride (10 grams) was evolved and removed from the system. The reaction is illustrated by the following equation:

$$(CH_2)_5{-}\overset{N}{\overset{\|}{C}}{-}O{-}CH_3 + Cl{-}\overset{O}{\overset{\|}{C}}OC_2H_5 \longrightarrow$$

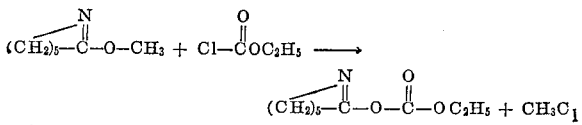

After cessation of methyl chloride evolution, the mixture was maintained at 75° C. under vacuum for one hour. The product O-carbethoxy caprolactim (or caprolactim ethyl carbonate) remained as a colorless oil, B.P. 95° C.–98° C. at 0.2 mm. Hg. The yield was 90% of the theoretical value.

Analysis.—Calculated: carbon 58.36%, hydrogen 8.16%, nitrogen 7.56%. Found: carbon 58.53%, hydrogen 8.33%, nitrogen 7.43%.

The utilization of the activators of this invention in the anionic polymerization of lactams is illustrated in the following examples, wherein all parts and percentages are by weight unless otherwise specified.

EXAMPLE 1

ε-Caprolactam containing less than 20 p.p.m. water was polymerized in a series of experiments utilizing as the anionic catalyst potassium caprolactam as prepared in Example A above, and, as activator, O-carbethoxy caprolactim prepared as in Example B above. The quantities of catalyst and activator were varied in separate experiments so as to study the effects of concentration of each ingredient. The polymerizations were performed in test tubes using approximately 30 grams of lactam composition in each tube, said tubes being immersed at the start of polymerization in a heated bath maintained at 160° C. For convenience in formulating the lactam composition for each experiment, master batches of catalyst dissolved in ε-caprolactam, and activator dissolved in ε-caprolactam were prepared at different concentration levels and stored at 95° C. before use. For polymerization studies, the desired predetermined quantities of each master batch were then blended in a test tube under nitrogen and the tube then placed in the preheated bath. The rate of polymerization in each experiment was studied by measuring the gell, solidification, and break-away times.

The polymer produced in each experiment was characterized in terms of the amount of extractible material remaining the composition, determined by comminuting the sample, extracting the comminuted product with hot water, and determining the weight of material thereby extractible. The degree of polymerization of each sample was determined by reduced viscosity measurements in metacresol at 25° C. and concentration of 0.5 gram per 100 cc. of solution, and by determination of terminal groups. A meta-cresol reduced viscosity of at least 1.25 dl./gm., especially about 1.5 dl./gm. and higher, is indicative of molecular weight high enough for use in most extrusion applications. This reduced viscosity of 1.5 dl./gm. corresponds to about 40 milli-equivalents of acid end groups per kilogram of polymer. In view of the mechanism of polymerization, the polymers hereby obtained generally have more acid end groups than amine end groups. The polymerized samples were qualitatively compared in color by visual observation. For purposes of comparison, a control experiment was carried out using 1 mol percent of potassium caprolactam catalyst without any activator, and experiments were carried out employing, in place of an activator of this invention, other chemical species described as activators in the prior art, namely N-acetyl caprolactam, described in U.S. Patent 3,017,391 of Jan. 16, 1962, to Mottus et al. and dialkyl carbonates described in British Patent 924,453 of Apr. 24, 1963, to Lewis et al. The experiments performed and data obtained are presented in Table I.

The data of Table I show that, in experiments A–I inclusive, within the purview of this invention, rapid polymerization and crystallization is obtained, and the polymers obtained have low extractible content and high molecular weight. In comparison with previously known processes, not part of this invention, exemplified by experiments J–N inclusive, it is seen that the process of this invention is generally superior in terms of rate of polymerization, extractible content and/or polymer molecular weight. Experiment O which employs no activator requires more than 7 hours for polymerization. The polymers obtained in experiments A–I inclusive were essentially non-discolored and generally whiter than polymers obtained in experiments J–O.

EXAMPLE 2

The effect of temperature was studied on the rate of polymerization of an ε-caprolactam composition containing 1 mol potassium caprolactam catalyst and 1 mol O-carbethoxy caprolactim activator per 100 mols lactam. The experimental procedure employed involved the preparation of suitable mixtures from separate master batches containing catalyst and activator, and carrying out the polymerization in test tubes in the absence of moisture. The experiments performed and the data thereby secured are indicated in Table II. Inspection of the data of Table II reveals that the rate of polymerization, as exemplified by the occurrence of gelling, increases with increasing temperature. The times required for solidification and break-away, which depend not only upon the degree of polymerization but also the degree of crystallization and melting point of the structure, do not parallel the gell time. It is noteworthy that regardless of the temperature employed, the degree of polymerization as determined by viscosity and end group measurements, and the percent extractible material remains essentially constant.

TABLE II

| Experiment | Temperature, °C. | Gel, sec. | Solidification, sec. | Breakaway, sec. | Wgt., % Extractibles | Meta-Cresol Viscosity, dl./gm. | End Groups (meq./kg.) | |
|---|---|---|---|---|---|---|---|---|
| | | | | | | | Acid | Amine |
| A | 130 | 200 | 280 | 385 | 3.1 | 1.06 | 57 | 16 |
| B | 140 | 200 | 230 | 380 | 2.8 | 1.07 | 53 | 20 |
| C | 150 | 165 | 190 | 290 | 2.8 | 1.09 | 54 | 17 |
| D | 160 | 150 | 175 | 280 | 2.9 | 1.10 | 53 | 17 |
| E | 170 | 140 | 160 | 260 | 2.6 | 1.08 | 44 | 30 |
| F | 180 | 95 | 165 | 475 | 3.4 | 1.11 | 45 | 25 |
| G | 190 | 95 | 170 | 800 | 3.1 | 1.20 | 48 | 30 |
| H | 200 | 85 | 175 | 1,280 | 4.0 | 1.14 | 36 | 30 |

This indicates that, in practical commercial operations wherein temperature gradients may exist throughout various regions of complex molds, the physical properties of the resultant molding will nevertheless be essentially uniform throughout.

TABLE I

| Experiment | Activator (Promoter) | Mol percent of Activator* | Mol percent of Potassium Caprolactam* | Gel, min. | Solidification, min. | Breakaway, min. | Percent Extractibles, weight | Meta-Cresol Viscosity, dl./gm. | End Groups | |
|---|---|---|---|---|---|---|---|---|---|---|
| | | | | | | | | | Acid (meq. per kg.) | Amine |
| A | O-carbethoxy caprolactim | 0.5 | 0.5 | 4.0 | 6.0 | 15.0 | 4.3 | 3.2 | 35 | 9 |
| B | do | 1.0 | 0.5 | 3.5 | 5.5 | 10.0 | 4.1 | 2.1 | 24 | 2 |
| C | do | 2.0 | 0.5 | 2.5 | 4.0 | 7.5 | 5.8 | 1.1 | 22 | 2 |
| D | do | 0.1 | 0.8 | 14.0 | 23.0 | 34.0 | 2.4 | 3.5 | 12 | 15 |
| E | do | 0.5 | 1.0 | 4.0 | 7.0 | 15.0 | 7.4 | 2.5 | 36 | 18 |
| F | do | 1.0 | 1.0 | 2.5 | 5.5 | 6.0 | 3.0 | 2.4 | 40 | 25 |
| G | do | 2.0 | 1.0 | 1.5 | 2.5 | 5.0 | 3.5 | 1.1 | 53 | 31 |
| H | do | 1.0 | 2.0 | 2.0 | 4.0 | 7.0 | 5.8 | 1.4 | 33 | 8 |
| I | do | 2.0 | 2.0 | 1.5 | 2.5 | 4.0 | 3.3 | 1.1 | 57 | 39 |
| J | N-acetyl caprolactam | 0.5 | 0.5 | 5.0 | 8.0 | 17.0 | 5.6 | 2.8 | 14 | 5 |
| K | do | 2.0 | 0.5 | 5.0 | 7.5 | 13.0 | 5.5 | 0.3 | 192 | |
| L | do | 2.0 | 1.0 | 2.0 | 3.5 | 8.0 | 26.6 | 0.7 | 81 | 3 |
| M | Diethyl carbonate | 1.0 | 1.0 | 6.5 | | | 8.0 | | | |
| N | Di-t-butyl carbonate | 1.0 | 1.0 | 8.0 | | | 15.0 | | | |
| O | None | 0.0 | 1.0 | ¹7 | | | | | | |

*Based upon the lactam. ¹ Hours.

EXAMPLE 3

Solutions of ε-caprolactam, 0-carbethoxy caprolactim, and potassium caprolactam in mol ratio 100:1:1 were prepared in dimethyl formamide and subjected to a temperature of 160° C. for 4 hours under nitrogen to effect polymerization. The degree of polymerization of the polymerized product was determined by reduced viscosity measurement in meta-cresol at 25° C. and 0.5 g./100 cc. of solution, and the percent conversion of monomer to polymer was determined based upon hot water extractible content in the polymer. Experiments were run at lactam solution concentrations of 40% and 50%, and for purposes of comparison, an activator or promoter of the prior art, N-acetyl caprolactam, was also studied. The details of experimental data are presented in Table III. In experiments A and C of Table III, employing the activator of this invention, a solution was obtained of polymer having viscosity high enough and monomer content low enough to allow spinning the solution into filaments by extruding it into an aqueous coagulating bath. By way of contrast, the solutions of polymer obtained in experiments B and D were unsuitable for direct extrusion to form filaments in view of their low viscosity and presence therein of excessively high amounts of non-polymerized lactam.

EXAMPLE 4

A composition was prepared comprising ε-caprolactam, O-carbethoxy caprolactim (1 mol percent), potassium caprolactam (1 mol percent), and 3% by weight of a fine particle size colloidal, non-porous silica reinforcing agent, analyzing 99.0–99.7 $SiO_2$ practically free of water; prepared by hydrolysis of a silicon compound in the vapor phase and having average particle diameter of about 15–20 millimicrons and surface area measured by the standard "BET" gas adsorption method of 175–200 sq. meters per gram; the specific material used was that sold under the trademark Cab-O-Sil, produced by the Cabot Corp. The composition was employed in the casting of a complex mechanical part in a heated open mold having various cross-sectional dimensions and configurations. The casting was carried out at 160° C. in contact with anhydrous air. The silica additive was found to act as a thickening agent to prevent undesired flow of the molten composition in the early stages of polymerization, and thereby facilitated the production of good quality moldings. Data obtained concerning the rate of polymerization and nature of the polymeric product are as follows:

| | |
|---|---|
| Gel time | sec__ 234 |
| Solidification time | sec__ 318 |
| Break-away time | sec__ 372 |
| Extractible content | percent__ 6.3 |
| Meta-cresol reduced viscosity | dl./gm__ 1.38 |
| Acid end groups | meq./kg.[1]__ 37 |
| Amine end groups | meq./kg__ 19 |

[1] Milliequivalents per kilogram.

By way of contrast the same experiment was performed except that N-acetyl caprolactam was substituted for O-carbethoxy caprolactam in the same molecular proportion. In this case it was found that no polymerization occurred. Both the colloidal silica and oxygen were found to inhibit polymerization when N-acetyl caprolactam was the promoter.

It thus appears that the promoters of this invention, in contrast to activators and promoters of the prior art are unexpectedly capable of retaining the ability to effect polymerization of an anionically catalyzed lactam system in the presence of oxygen and in presence of additives which ordinarily interfere with operation of previously recommended systems for the anionic polymerization of lactams.

Example 5

A series of promoters of this invention were prepared essentially as in Example B above but using instead of ethyl chloroformate, the molecular equivalent of various chloroformic esters in which the ester group was as shown under "$R_2$" in Table IV below. The effectiveness of these compounds as promoters was tested with ε-caprolactam and potassium caprolactam catalyst in test tube polymerizations carried out essentially by the method of Example 1. All experiments were run at 160° C. employing 1 mol percent of potassium caprolactam and 1 mol percent of the activator. Experimental data thereby obtained are presented in Table IV.

TABLE III

| Experiment | Activator (Promoter) | Solution Concentration, Percent | Time, hours | Percent Conversion | Meta-Cresol Viscosity, dl./gm. |
|---|---|---|---|---|---|
| A | O-carbethoxy carpolactim | 50 | 4 | 85 | 1.42 |
| B | N-acetyl caprolactam | 50 | 4 | 75 | 0.55 |
| C | O-carbethoxy caprolactim | 40 | 4 | 89 | 1.25 |
| D | N-acetyl caprolactam | 40 | 4 | 52 | 0.75 |

As the data of Table IV indicate, satisfactory results are obtained with a representative variety of choices for the ester radical designated $R_2$ in the general formula above for my promoters.

Example 6

A series of promoters within the scope of this invention were prepared essentially as in Example B above but replacing caprolactim O-methyl ether by the molecular equivalent of O-methyl ether of the various nitrogen-containing radicals shown in Table V below; except for the di-2-pyridyl carbonate ("E" of Table V) which was prepared generally as in Example B but using 2-methoxypyridine and phosgene as the reactants. These were tested for effectiveness as promoters in the polymerization of ε-caprolactam employing essentially the procedure of Example 1 using 0.8 mol of lithium hydride catalyst per 100 mols of lactam and promoter concentration as shown in Table V below. Table V outlines these experiments and the data thereby obtained.

As the data of Table V show, various nitrogen-containing ester radicals derived from lactim structures, within the scope of this invention, are effective promoters of anionic lactam polymerization.

TABLE IV

| Test | $R_2$ | Gel, sec. | Solidification, sec. | Breakaway, sec. |
|---|---|---|---|---|
| A | $CH_3-$ | 450 | 575 | 650 |
| B | $n-C_3H_7-$ | 60 | 115 | 200 |
| C | $n-C_4H_9-$ | 180 | 200 | 285 |
| D | $n-C_5H_{11}-$ | 50 | 100 | 167 |
| E | $n-C_6H_{13}-$ | 80 | 160 | 185 |
| F | Phenyl | 330 | 1,000 | 1,300 |
| G | Cyclohexyl | 170 | 195 | 280 |

Example 7

An equal molar mixture of lauryl caprolactam and 4,4-dimethylazetidine-2-one is dissolved in dimethyl sulfoxide to form a solution of 10% concentration. Potassium caprolactam (1 mol percent) and O-carbethoxy caprolactim (1 mol percent) are then added, and the mixture is refluxed for four hours. The polymer which forms is found suitable for use in the molding of shaped objects.

As many widely different embodiments may be employed or made without departing from the spirit and scope of this invention, it is to be understood that the invention is to be in no wise restricted save as set forth in the appended claims.

TABLE V

| Experiment | Activator (or Promoter) | R₂ | Mol Percent of Activator | Temperature, °C. | Gel Time, min. |
|---|---|---|---|---|---|
| A | 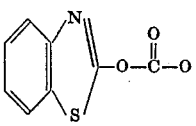 | —CH₂CH₃ | 0.6 | 180 | 9.0 |
| B | 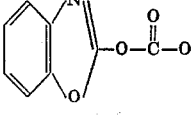 | —CH₂CH₃ | 1.0 | 165 | 4.5 |
| C | 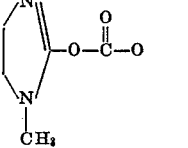 | —CH₂CH₃ | 0.8 | 170 | 11.5 |
| D | 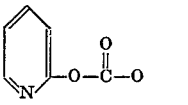 | —CH₂CH₃ | 0.7 | 185 | 7.0 |
| E | 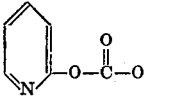 |  | 0.8 | 175 | 10.5 |

I claim:

1. In a process for anionically polymerizing with an anionic catalyst and under anhydrous conditions lactams the improvement which comprises providing as promoter of the polymerization at least one carbonate diester of the formula $$R_1OCOR_2$$
$$\text{O}$$

wherein at least one of the ester radicals designated $R_1$ and $R_2$ in the formula is of the group consisting of (a) radicals in which a carbon atom of the radical is linked to an oxy oxygen atom of the carbonate radical, which carbon atom in turn is bonded by a double bond to a nitrogen atom in the ester radical; and (b) radicals in which a carbon atom of the radical is linked to an oxy oxygen atom of the carbonate radical, said carbon atom being in one of the positions 2- and 4- in a 6-membered aromatic heterocyclic ring wherein nitrogen is in the 1-position which heterocyclic ring contains, in addition to the above specified carbon and nitrogen atoms, only atoms selected from the group consisting of carbon, nitrogen, oxygen and sulfur.

2. Improvement of claim 1 wherein said carbon atom linking said ester radical to said oxy oxygen atom is a member of a heterocyclic ring, which ring contains said nitrogen atom specified in claim 1 and contains, in addition to the above specified carbon and nitrogen atoms, only atoms selected from the group consisting of carbon, nitrogen, oxygen and sulfur.

3. Improvement of claim 2 wherein said heterocyclic ring is saturated except for the double bond between said nitrogen atom and said carbon atom linking said ester radical to said oxy oxygen.

4. Improvement of claim 3 wherein said ring of said ester radical consists of carbon atoms and 1 nitrogen atom and has at least 5 members.

5. Improvement of claim 2 wherein at least the major proportion by weight of the lactam polymerized is lactam having a ring of at least 7 members, consisting of methylene groups and one carbamide group; the polymerization is under anhydrous conditions and the promoter is a carbonate diester wherein one of the ester radicals is the ε-caprolactim radical and the other ester radical is ε-caprolactim or is an alkyl, aryl, aralkyl, cycloalkyl or heterocyclic radical free of active hydrogen atoms as determined by the Zerewitinoff method.

6. Improvement of claim 5 wherein at least the major proportion of the lactam polymerized is ε-caprolactam.

7. Process for anionically polymerizing ε-caprolactam which comprises forming, in a solvent for polyamide free of active hydrogen, a dispersion comprising ε-caprolactam, anionic polymerization catalyst and at least one promoter as defined in claim 1; and maintaining said solution under anhydrous conditions at temperature of a least about 100° C. at least until the viscosity of the resulting solution is high enough to allow spinning the solution into fibers by extrusion.

8. Process of claim 7 wherein said solvent for polyamide is dimethyl formamide; the reduced viscosity of the resulting polymer is at least 1.25 deciliters per gram measured in metacresol at 25° C. and 0.5 gram per 100 cc. concentration.

9. Process of claim 8 wherein the promoter is at least one carbonate diester wherein one of the ester radicals is the ε-caprolactim radical and the other ester radical is ε-caprolactim or is an alkyl, aryl, aralkyl, cycloalkyl or heterocyclic radical free of active hydrogen atoms as determined by the Zerewitinoff method.

10. Process for anionically polymerizing ε-caprolactam which comprises forming a reaction mixture comprising ε-caprolactam, a solid additive substantially free of water, anionic polymerization catalyst, and at least one promoter defined in claim 1; and maintaining said reaction mixture under anhydrous conditions at temperature of at least about 100° C. but not above the polymer decomposition temperature at least until the reduced viscosity of the polymer is 1.25 deciliters per gram as determined in metacresol at 25° C. and 0.5 gram per 100 cc. concentration.

11. Process of claim 10 wherein the promoter is at least one carbonate diester wherein one of the ester radicals is the ε-caprolactim radical and the other ester radical is ε-caprolactim or is an alkyl, aryl, aralkyl, cycloalkyl or heterocyclic radical free of active hydrogen atoms as determined by the Zerewitinoff method defined in claim 2 and wherein the solid additive is colloidal silica.

12. Process for anionically polymerizing ε-caprolactam which comprises forming an anhydrous reaction mixture comprising ε-caprolactam, anionic polymerization catalyst and at least one promoter defined in claim 1 and bringing said reaction mixture to a temperature of at least about 100° C. but not above the decomposition temperature of the resulting polymer, said reaction mixture being exposed to oxygen during at least part of the time while it is at said temperature, of at least 100° C.; and maintaining said reaction mixture under anhydrous conditions at temperature of at least 100° C. at least until gelation of the reaction mixture sets in.

13. Process of claim 12 wherein the promoter is at least one carbonate diester wherein one of the ester radicals is the ε-caprolactim radical and the other ester radical is ε-caprolactim or is an alkyl, aryl, aralkyl, cycloalkyl or heterocyclic radical free of active hydrogen atoms as determined by the Zerewitinoff method defined in claim 2.

14. Process for anionically polymerizing ε-caprolactam which comprises forming a reaction mixture comprising ε-caprolactam, an alkali metal salt of ε-caprolactam in catalytic quantities, and O-carbethoxy caprolactim promoter; and maintaining said reaction mixture under anhydrous conditions at temperature of at least about 120° C. but not above the decomposition temperature of the resulting polymer at least until the reduced viscosity of the resulting polymer in meta-cresol at 25° C. and 0.5 gram per 100 cc. concentration reaches 1.25 deciliters per gram.

15. A lactam composition polymerizable by anionic catalysts, consisting essentially of ε-caprolactam and a carbonate diester of the formula

wherein at least one of the ester radicals designated $R_1$ and $R_2$ in the formula is linked to an oxy oxygen atom of the carbonate radical by a carbon atom which is a member of a heterocyclic ring, said ring containing a nitrogen atom bonded by a double bond to said carbon atom which heterocyclic ring contains, in addition to the above specified carbon and nitrogen atoms, only atoms selected from the group consisting of carbon, nitrogen, oxygen and sulfur.

16. A lactam composition of claim 15 polymerizable by anionic catalysts, consisting essentially of ε-caprolactam and a carbonate diester wherein at least one of the ester radicals is linked to an oxy oxygen atom of the carbonate radical by a carbon atom which is member of a heterocyclic ring, said ring being a six-membered aromatic ring in which said carbon atom is in one of the positions 2- and 4-, and nitrogen is in the 1-position.

17. Composition of claim 15 wherein the carbonate diester is O-carbethoxy caprolactim.

18. A lactam composition polymerizable by anionic polymerization catalysts, consisting essentially of ε-caprolactam and as promoter at least one carbonate diester of the formula

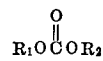

wherein at least one of the ester radicals designated $R_1$ and $R_2$ in the formula is of the group consisting of (a) radicals in which a carbon atom of the radical is linked to an oxy oxygen atom of the carbonate radical, which carbon atom in turn is bonded by a double bond to a nitrogen atom in the ester radical; and (b) radicals in which a carbon atom of the radical is linked to an oxy oxygen atom of the carbonate radical, said carbon atom being in one of the positions 2- and 4- in a 6-membered aromatic heterocyclic ring wherein nitrogen is in the 1-position which heterocyclic ring contains, in addition to the above specified carbon and nitrogen atoms, only atoms selected from the group consisting of carbon, nitrogen, oxygen and sulfur.

References Cited
UNITED STATES PATENTS
2,874,139   2/1959   Syncons  ------------ 260—78
3,239,490   3/1966   Gee et al.  ---------- 260—78

WILLIAM H. SHORT, *Primary Examiner.*

H. D. ANDERSON, *Assistant Examiner.*

UNITED STATES PATENT OFFICE
CERTIFICATE OF CORRECTION

Patent No. 3,397,185                          August 13, 1968

Marvin T. Tetenbaum

It is certified that error appears in the above identified patent and that said Letters Patent are hereby corrected as shown below:

Column 15, lines 1, 20 and 21, cancel "defined in claim 2", each occurrence. Column 16, line 8, after "is" insert -- a --.

Signed and sealed this 13th day of January 1970.

(SEAL)
Attest:

Edward M. Fletcher, Jr.                      WILLIAM E. SCHUYLER, JR.
Attesting Officer                              Commissioner of Patents